United States Patent
Kim et al.

(10) Patent No.: US 8,958,489 B2
(45) Date of Patent: Feb. 17, 2015

(54) METHOD OF MODULATING SIGNAL FOR DATA COMMUNICATION AND DEVICE THEREOF

(75) Inventors: Kijun Kim, Anyang-si (KR); Byounghoon Kim, Anyang-si (KR); Joonho Cho, Pohang-Si (KR); Yeohun Yun, Pohang-Si (KR); Byungwook Han, Pohang-Si (KR)

(73) Assignees: LG Electronics Inc., Seoul (KR); Postech Academy-Industry Foundation, Pohang-Si, Gyeongsangbuk-Do (KR)

( * ) Notice: Subject to any disclaimer, the term of this patent is extended or adjusted under 35 U.S.C. 154(b) by 0 days.

(21) Appl. No.: 13/978,335

(22) PCT Filed: Jan. 6, 2012

(86) PCT No.: PCT/KR2012/000172
§ 371 (c)(1),
(2), (4) Date: Jul. 3, 2013

(87) PCT Pub. No.: WO2012/093899
PCT Pub. Date: Jul. 12, 2012

(65) Prior Publication Data
US 2013/0279632 A1    Oct. 24, 2013

Related U.S. Application Data

(60) Provisional application No. 61/430,188, filed on Jan. 6, 2011.

(51) Int. Cl.
*H04L 27/28* (2006.01)
*H04L 27/20* (2006.01)
*H04L 27/26* (2006.01)

(52) U.S. Cl.
CPC ............ *H04L 27/20* (2013.01); *H04L 27/2636* (2013.01)
USPC ....................................... 375/260

(58) Field of Classification Search
CPC .............. H04L 5/0007; H04L 27/2636; H04L 25/03343; H04L 27/2621; H04L 1/0041; H04L 27/2607; H04L 27/28; H04L 27/2634
USPC ................. 375/259–260, 267, 285, 295–296; 370/208, 210, 329
See application file for complete search history.

(56) References Cited

U.S. PATENT DOCUMENTS 8,526,529 B2* 9/2013 Ahn et al. ..................... 375/295
2006/0176936 A1 8/2006 Wang et al.
(Continued)

OTHER PUBLICATIONS

Mohanty, "Analysis and Study of Multi-Symbol Encapsulated Orthogonal Frequency Division Multiplexing", 2010, pp. 1-65.
(Continued)

*Primary Examiner* — Khanh C Tran
(74) *Attorney, Agent, or Firm* — Birch, Stewart, Kolasch & Birch, LLP

(57) ABSTRACT

The present invention relates to a method for modulating a signal, which is a signal modulation method for data communication, and the method comprises the steps of: forming a data symbol sequence to which a symbol 0 having the overall length of N are added, by adding M−1 symbols 0 to each symbol of a data symbol sequence; performing an N-point fast Fourier transform for the data symbol sequence to which said symbols 0 are added; performing precoding for said fast-Fourier-transformed data symbol sequence; and forming a final transmission symbol sequence by performing an inverse fast Fourier transform for said precoded data symbol sequence. Further, the present invention relates to a transmitter which comprises: a symbol adding unit that forms a data symbol sequence to which the symbol 0 having the overall length of N is added, by adding M−1 symbols 0 to each symbol of a data symbol sequence; a fast Fourier transform unit that performs an N-point fast Fourier transform for the data symbol sequence to which said symbols 0 are added; a precoding unit that performs precoding for said fast-Fourier-transformed data symbol sequence; and an inverse fast Fourier transform unit that forms a final transmission symbol sequence by performing an inverse fast Fourier transform for said precoded data symbol sequence.

13 Claims, 4 Drawing Sheets

(56) References Cited

U.S. PATENT DOCUMENTS

2008/0049709 A1* 2/2008 Pan et al. .................. 370/344
2013/0064217 A1* 3/2013 Khan et al. ................. 370/330
2013/0279439 A1* 10/2013 Takahashi et al. .......... 370/329

OTHER PUBLICATIONS

Song et al, "Orthogonality Analysis and Improvement of MSE-OFDM System", IEEE, 2010, International Conference on Information, Networking and Automation (ICINA), Oct. 18-19, 2010, pp. VI-433 to VI-437.

* cited by examiner

FIG. 7
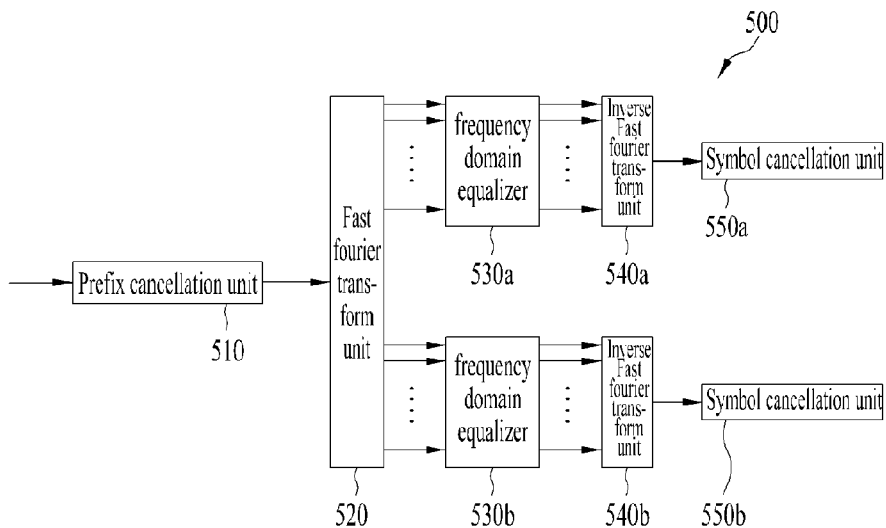
FIG. 8
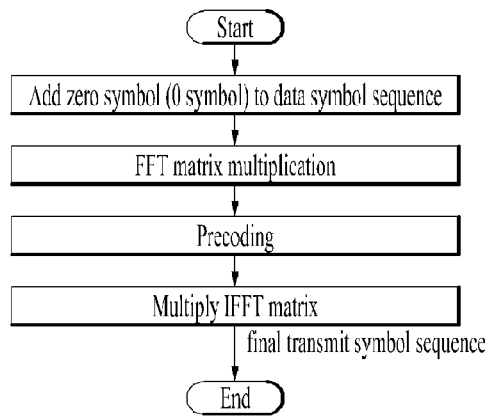
FIG. 9a
$$b = \begin{bmatrix} 1 & 0 & 1 & 1 \end{bmatrix}^T$$
$$\quad\; b(1)\; b(2)\; b(3)\; b(4)$$
FIG. 9b
Phase 0 : $b_{ZP,0} = \begin{bmatrix} 1\,0\,0 & 0\,0\,0 & 1\,0\,0 & 1\,0\,0 \end{bmatrix}^T$
Phase 1 : $b_{ZP,1} = \begin{bmatrix} 0\,1\,0 & 0\,0\,0 & 0\,1\,0 & 0\,1\,0 \end{bmatrix}^T$
Phase 2 : $b_{ZP,2} = \begin{bmatrix} 0\,0\,1 & 0\,0\,0 & 0\,0\,1 & 0\,0\,1 \end{bmatrix}^T$

FIG. 9c
$$F_{12} = \frac{1}{12^{\frac{1}{2}}} \begin{bmatrix} 1 & 1 & 1 & \cdots & 1 \\ 1 & w_{12} & w_{12}^2 & \cdots & w_{12}^{11} \\ 1 & w_{12}^2 & w_{12}^4 & \cdots & w_{12}^{22} \\ \vdots & & & & \vdots \\ 1 & w_{12}^{11} & w_{12}^{22} & \cdots & w_{12}^{121} \end{bmatrix}$$
FIG. 10
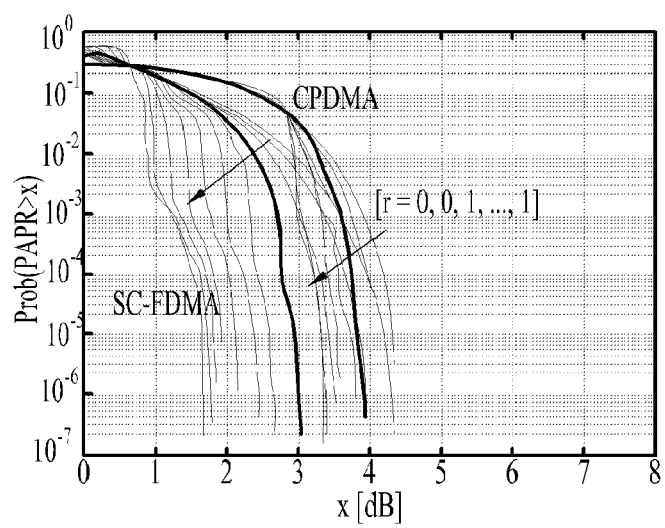
FIG. 11
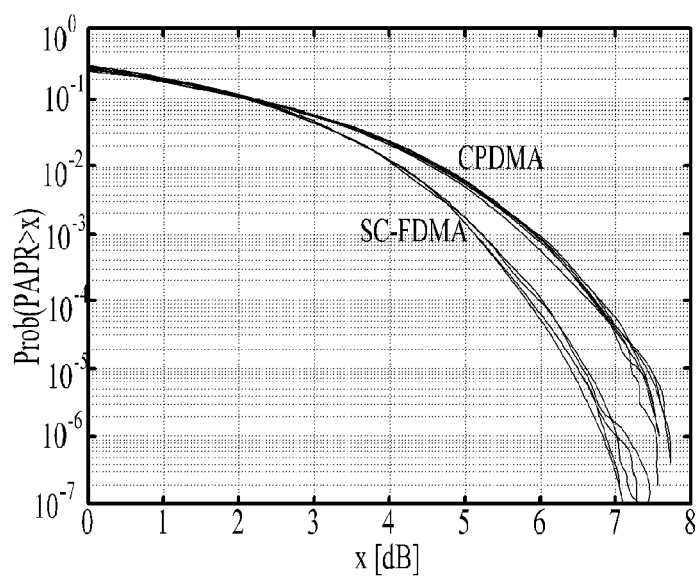

METHOD OF MODULATING SIGNAL FOR DATA COMMUNICATION AND DEVICE THEREOF

This application is the National Phase of PCT/KR2012/000172 filed on Jan. 6, 2012, which claims priority under 35 U.S.C. 119(e) to US Provisional Application No. 61/430,188 filed on Jan. 6, 2011, all of which are hereby expressly incorporated by reference into the present application.

FIELD OF THE INVENTION

The present invention relates to a signal modulation method and apparatus for data communication.

BACKGROUND ART

Typically, the oldest techniques in the cellular environment are North America TDMA and GSM based on time division multiple access (TDMA). The North America TDMA and GSM based on TDMA can improve system throughput through the second- or third-generation code division multiple access (CDMA) based on the Direct Sequence Spread Spectrum (DS-SS) scheme.

Thereafter, the orthogonal frequency division multiplexing (OFDM) scheme has been adapted to WLAN communication standards such as IEEE 802.11a and IEEE 802.11g, and the orthogonal frequency division multiple access (OFDMA) scheme has been selected as technology for the next generation cellular network such as WiMAX or LTE.

In addition, the SC-FDMA acting as one modification of OFDM has robustness against the multi-path environment in the same manner as in the SC-FDMA, such that the SC-FDMA is appropriate for wideband high-speed data communication. Since the SC-FDMA requires a relatively simple complexity in the transmitter configuration, the SC-FDMA has been selected as uplink technology of the next generation cellular system.

In the broadband transmission/reception system applicable to a cellular network such as the legacy CDMA or OFMDA/SC-FDMA, a minimum unit of allocable communication resources is set to a code and a subcarrier and is then allocated to each user, such that multiple access is possible.

In addition, for access of a new user, an unused code may be allocated according to CDMA or unused subcarriers may be allocated according to OFDMA/SC-FDMA, such that user entry is allowed.

Since a minimum unit of a code or subcarrier acting as an allocable resource is decided and a data transfer rate is also fixed, a maximum number of supportable users are limited.

As a result, if there are a large number of users, it may be impossible to accommodate many users, or resource allocation between priority users may not be efficiently carried out. The number of supportable users is limited, so that system flexibility is deteriorated under a specific environment in which entrance/exiting of users on the network frequently occurs or channel variation frequently occurs.

As a simple example for increasing system flexibility to efficiently distribute communication resources between users using the conventional multiplexing and multiple access system, a CDMA system for allowing a multi-rate multi-code may be considered.

If a new user occurs in a communication network of the CDMA system, a base station (BS) confirms the presence or absence of available code dimension, such that signal design for allocating several transfer rates and several codes to each user after allowing the multi-rate and multi-code is allowed.

This signal design may be implemented through selection of a transfer rate and code of a signature waveform. However, if orthogonal codes are applied to individual users, the loss of a bandwidth occurs due to an excessive bandwidth of a chip pulse, such that spectrum efficiency is relatively deteriorated. If there is no redundant available code space, entrance of the user may not be allowed. Alternatively, if the user entrance is allowed, throughput deterioration of legacy users may unavoidably occurs.

DETAILED DESCRIPTION OF THE INVENTION

Technical Problem

The present invention relates to a signal modulation method and apparatus appropriate for a broadband communication system, which can flexibly perform resource allocation and transfer rate selection when a user enters or exits a network under a communication environment (such as a cellular system) including a plurality of users.

Therefore, an object of the present invention is to provide a signal modulation method and apparatus in which at least one 0-symbol is added on the basis of a phase using different cyclic periods of a user signal, and orthogonality is achieved on a time domain between user signals, such that all frequencies can be used by all users.

Technical Solution

The object of the present invention can be achieved by providing a signal modulation method for data communication including: adding (M−1) zero symbols to each symbol of a data symbol sequence, and forming a data symbol sequence to which a zero symbol (i.e., 0 symbol) having a total length of N is added; performing an N-point FFT process on the data symbol sequence to which the zero symbol is added; precoding the FFT-processed data symbol sequence; and forming a final transmission symbol sequence by performing an IFFT on the precoded data symbol sequence.

The forming the data symbol sequence to which the zero symbol is added may include divisionally adding the (M−1) zero symbols to a front part and a rear part of each symbol on the basis of a phase.

The forming the data symbol sequence to which the zero symbol is added may include: adding a predetermined number of zero symbols corresponding to the phase value from among the (M−1) zero symbols to the front part of each symbol, and adding the remaining number of zero symbols other than the predetermined number of zero symbols to the rear part of each symbol.

The forming the data symbol sequence to which the zero symbol is added may include: divisionally adding the (M−1) zero symbols to the front part and the rear part of each symbol on the basis of a plurality of phases in different ways, such that as many data symbol sequences to which the zero symbol is added as the number of the plurality of phases are formed.

The precoding the FFT-processed data symbol sequence may include: performing spectral shaping of the FFT-processed data symbol sequence by a spectral shaping filter.

The forming the data symbol sequence to which the zero symbol is added may include: divisionally adding the (M−1) zero symbols to a front part and a rear part of each symbol on the basis of a plurality of phases in different ways, and forming as many data symbol sequences (to which the zero symbol is added) as the number of the plurality of phases. The precoding may include: applying different spectral shaping filters to as many 0-symbol-added data symbol sequences as the number of phases.

The method may further include: adding a cyclic prefix to the final transmission symbol sequence.

In accordance with another aspect of the present invention, a transmitter includes: a symbol addition unit for adding (M−1) zero symbols to each symbol of a data symbol sequence, and forming a data symbol sequence to which a zero symbol (i.e., 0 symbol) having a total length of N is added; a Fast Fourier Transform (FFT) unit for performing an N-point FFT process on the data symbol sequence to which the zero symbol is added; a precoding unit for precoding the FFT-processed data symbol sequence; and an Inverse FFT (IFFT) unit for forming a final transmission symbol sequence by performing an IFFT on the precoded data symbol sequence.

The symbol addition unit may divisionally add the (M−1) zero symbols to a front part and a rear part of each symbol on the basis of a phase.

The symbol addition unit may add a predetermined number of zero symbols corresponding to the phase value from among the (M−1) zero symbols to the front part of each symbol, and add the remaining number of zero symbols other than the predetermined number of zero symbols to the rear part of each symbol.

The symbol addition unit may divisionally add the (M−1) zero symbols to the front part and the rear part of each symbol on the basis of a plurality of phases in different ways, such that as many data symbol sequences to which the zero symbol is added as the number of the plurality of phases are formed.

The precoding unit may include performing spectral shaping of the FFT-processed data symbol sequence by a spectral shaping filter.

The symbol addition unit may include divisionally adding the (M−1) zero symbols to a front part and a rear part of each symbol on the basis of a plurality of phases in different ways, and forming as many data symbol sequences (to which the zero symbol is added) as the number of the plurality of phases; and the precoding unit may include applying different spectral shaping filters to as many 0-symbol-added data symbol sequences as the number of phases.

The transmitter may further include: a prefix addition unit for adding a cyclic prefix to the final transmission symbol sequence.

Effects of the Invention

As is apparent from the above description, according to the signal modulation method and apparatus of the embodiments of the present invention, a plurality of users can efficiently perform communication under the environment including an interference signal.

The signal modulation method and apparatus according to the embodiments of the present invention may include advantages of the legacy CDMA, OFDMA, and SC-OFDMA, and may design the multiplexing and multiple access system capable of being flexibly applied to various channel environments.

The signal modulation method and apparatus according to the embodiments of the present invention are appropriate for a multi-user environment such as a cellular network, and thus may coexist with the legacy multi-user system.

BRIEF DESCRIPTION OF THE DRAWINGS

FIG. 7 is a block diagram illustrating a receiver provided when a multi-symbol subsequence is used and an independent spectral shaping filter is used.

FIG. 8 is a flowchart illustrating a signal modulation method according to an embodiment of the present invention.

FIG. 9A illustrates a data symbol sequence modulated by a signal modulation method according to an embodiment of the present invention.

FIG. 9B illustrates a data symbol sequence to which a zero symbol (0 symbol) is added on the basis of a plurality of phases modulated by a signal modulation method according to an embodiment of the present invention.

FIG. 9C illustrates a Fast Fourier Transform (FFT) matrix for a data symbol sequence modulated by a signal modulation method according to an embodiment of the present invention.

FIG. 10 illustrates the throughput comparison result between a symbol modulated by a signal modulation method and a BPSK symbol modulated by the SC-FDMA according to an embodiment of the present invention.

FIG. 11 is a graph illustrating the throughput comparison result between a symbol modulated by a signal modulation method and a Gaussian codebook symbol modulated by the SC-FDMA according to an embodiment of the present invention.

BEST MODE FOR CARRYING OUT THE INVENTION

Figure 1:
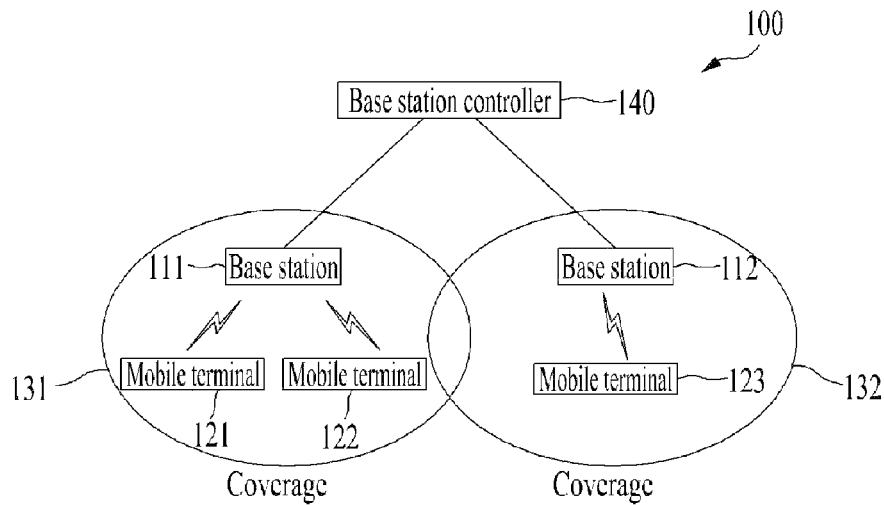
FIG. 1 is a block diagram illustrating a cellular system.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

UTRA is a part of UMTS (Universal Mobile Telecommunications System). 3GPP (3rd Generation Partnership Project) LIE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

Technical terms used in this specification are used merely to illustrate specific embodiments, and it should be understood that they are not intended to limit the present disclosure. So long as not defined otherwise, all terms used herein including technical terms may have the same meaning as those generally understood by an ordinary person skilled in the art to which the present disclosure pertains, and should not be construed in an excessively comprehensive manner or an extremely restricted manner. In addition, if a technical term used in the description of the present disclosure is an erroneous term that fails to clearly express the idea of the present disclosure, it should be replaced by a technical term that can be properly understood by those skilled in the art.

A singular representation may include a plural representation unless the context clearly indicates otherwise. It will be understood that the terms 'comprising', 'include', etc., when used in this specification, specify the presence of several components or several steps and part of the components or steps may not be included or additional components or steps may further be included.

In the following description, a suffix "module" or "unit" contained in terms of constituent elements to be described will be selected or used together in consideration only of the convenience of writing the following specification, and the suffixes "module" and "unit" do not necessarily have different meanings or roles.

In describing the present invention, a detailed description of known functions and configurations will be omitted when it may obscure the subject matter of the present invention. The accompanying drawings are used to help easily understand the technical idea of the present invention and it should be understood that the idea of the present invention is not limited by the accompanying drawings.

The embodiments will hereinafter be described with reference to the attached drawings.

Cellular System

FIG. 1 is a block diagram illustrating a cellular system.

Referring to FIG. 1, the cellular system 100 includes a plurality of base stations (BSs) (111, 112) and a plurality of user equipments (UEs) (121, 122, 123) in the network. In addition, the cellular system 100 includes cells (131, 132) covered by the plurality of BSs (111, 112) and a Base Station Controller (BSC) 140 connected to the plurality of BSs (111, 112). The cellular system 100 may include a plurality of BSs and a plurality of UEs in additional to the constituent elements of FIG. 1.

The cellular system 100 may use a plurality of carriers to achieve communication among the BSs (111, 112) and the UEs (121, 122, 123).

The carrier may include an uplink (UL) carrier and a downlink (DL) carrier. For example, different carriers may be used for uplink and downlink in the frequency division duplexing (FDM).

The cellular system 100 may use the OFDM, OFDMA, or SC-FDMA scheme as a modulation scheme.

The carriers may be divided on a transmission (Tx) time basis. When packets are transmitted from the UEs (121, 122, 123) to the BSs (111, 112), a specific carrier is selected and a transmission time is allocated on a Tx time basis, such that the data block can be transmitted for the corresponding Tx time.

The BSs (111, 112) may inform the UEs (121, 122, 123) of the selected carrier and the Tx time control information using a control link established among the BSs (111, 112) and the UEs (121, 122, 123).

In the cellular system 100, each of the BSs (111, 112) may operate as the transmitter, and each of the UEs (121, 122, 123) may operate as the receiver.

An error detection code through which the receiver can determine the presence or absence of an error in reception of the data block may be added to the data block. If the error is present in the received data block, and the receiver may transmit a non-acknowledgement (NACK) signal to the transmitter. In contrast, if there is no error in the received data block, the receiver may transmit the acknowledgement (ACK) signal. If the transmitter receives the NACK signal, the transmitter may retransmit the same data block.

In the following description, the transmitter and the receiver configured to perform signal modulation for data communication in the cellular system 100 will hereinafter be described in detail. The transmitter may operate as BS (111 or 112) and the receiver may operate as UE (121, 122, or 123) according to a data transmission/reception mode.

Transmitter

Figure 2:
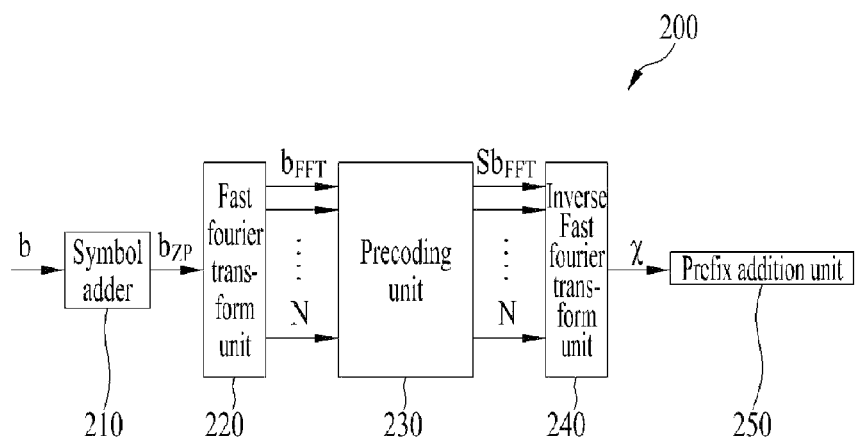
FIG. 2 is a block diagram illustrating a transmitter provided when a single symbol subsequence is used according to an embodiment of the present invention.

FIG. 2 is a block diagram illustrating a transmitter provided when a single symbol subsequence is used according to an embodiment of the present invention.

Referring to FIG. 2, the transmitter 200 may include a symbol addition unit 210, a Fast Fourier Transform (FFT) unit 220, a precoding unit 230, an Inverse Fast Fourier Transform (IFFT) unit 240, and a prefix addition unit 250.

The symbol adder 210 may add a zero symbol (0 symbol) to each symbol of a data symbol sequence. The symbol addition unit 210 may add (M−1) 0 symbols to each symbol of the data symbol sequence, such that it may form a data symbol sequence to which the 0 symbol having a total length of N is added.

The symbol addition unit 210 may divisionally add the (M−1) 0 symbols to the front part and the rear part of each symbol on the basis of a phase.

In addition, the symbol addition unit 210 may add a predetermined number of the zero symbols (0 symbols) corresponding to the phase value from among the (M−1) 0 symbols to the front part of each symbol, and may add the remaining number of the zero symbols to the rear part of each symbol.

In addition, the symbol addition unit 210 may divisionally add the (M−1) 0 symbols to the front part and the rear part of each symbol on the basis of a plurality of phases in different ways, such that as many the data symbol sequences (to which the zero symbol (0 symbols) are added) as the number of a plurality of phases may be formed.

The FFT unit 220 may perform the FFT process on the data symbol sequence.

The FFT unit 220 may multiply an FFT matrix by the data symbol sequence to which the zero symbols (0 symbols) are added, such that it may perform FFT processing. The FFT matrix may be a square matrix having the size of N. That is, the FFT unit 220 may perform FFT processing by multiplying an N-point FFT matrix by the data symbol sequence having the length of N.

The precoding unit 230 may precode the FFT-processed data symbol sequence. The precoding unit 230 may allow the transmitter 200 to multiply the precoding matrix by the data symbol sequence obtained by multiplication of the FFT matrix, such that it may perform precoding.

The precoding unit 230 may perform spectral shaping of the FFT-processed data symbol sequence by the spectral shaping filter. The precoding unit 230 may perform precoding in such a manner that it has a spectrum of a target transmission signal of the data symbol sequence by the spectral shaping filter. The matrix used by the spectral shaping filter may be a square matrix having the size of N in the same manner as in the FFT matrix.

In addition, the precoding unit 230 may divisionally add the (M−1) zero symbols to the front part and the rear part of each symbol on the basis of a plurality of phases by the symbol addition unit 210 in different ways, and different spectral shaping filters can be applied to the data symbol sequence to which as many the zero symbols (0 symbols) as the number of phases.

The IFFT unit 240 performs IFFT processing on the precoded data symbol sequence, such that it may form the last transmission symbol sequence. The IFFT unit 240 may multiply the IFFT matrix by the data symbol sequence obtained by multiplication of the precoding matrix, such that it can form the last transmission symbol sequence.

The prefix addition unit 250 may add a cyclic prefix to the last transmission symbol sequence. The prefix addition unit 250 may add a cyclic prefix to the last transmission symbol sequence so as to prevent the occurrence of interference between channels. In this case, the prefix addition unit 250 may copy some of the rear part of the last transmission symbol sequence, and add the copied result to the last Tx symbol sequence, such that it may perform addition of the cyclic prefix.

The constituent elements of the transmitter 200 shown in FIG. 2 are not all essential constituent elements, and the transmitter 200 can be implemented by more or less constituent elements than those of FIG. 2.

Figure 3:
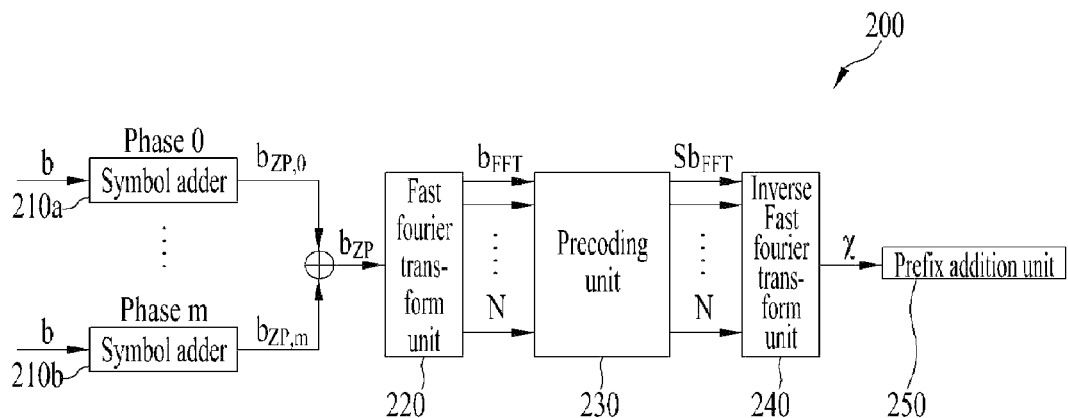
FIG. 3 is a block diagram illustrating a transmitter provided when a multi-symbol subsequence is used and a common spectral shaping filter is used.

FIG. 3 is a block diagram illustrating a transmitter provided when a multi-symbol subsequence is used and a common spectral shaping filter is used.

Referring to FIG. 3, the symbol addition unit 210 for use in the transmitter 200 may divisionally add (M−1) zero symbols (i.e., (M−1) 0 symbols) to the front part or the rear part of each symbol on the basis of a phase.

In addition, the symbol addition unit 210 may add a predetermined number of zero symbols corresponding to the phase value from among the (M−1) zero symbols to the front part of each symbol, and may add the remaining number of zero symbols to the rear part of each symbol.

In addition, the symbol addition unit 210 may divisionally add the (M−1) zero symbols to the front part and the rear part of the symbol on the basis of a plurality of phases in different ways, such that as many data symbol sequences (to which the zero symbol is added) as the number of phases may be formed.

In more detail, as shown in FIG. 3, the transmitter 200 may distribute different phases (Phase 0 to Phase m) for a plurality of users, and may divisionally add the (M−1) zero symbols to the front part and the rear part of each symbol on the basis of a plurality of phases (Phase 0 to Phase m) in different ways. As a result, the number of data symbol sequences ($b_{zp,0}$~$b_{ZP,m}$) to which the zero symbol is added is identical to the number (m) of distributed phases.

The transmitter 200 may include a plurality of symbol addition units (210a, 210b) configured to divisionally add the (M−1) zero symbols on the basis of a plurality of phases (Phase 0 to Phase m). The symbol addition units (210a, 210b) may be contained in each of the phases (Phase 0 to Phase m). The transmitter 200 may be configured to use a multiple symbol subsequence.

As can be seen from FIG. 3, the transmitter may enable the plurality of symbol addition units (210a, 210b) to add the (M−1) zero symbols, such that the data symbol sequences ($b_{ZP,0}$ to $b_{ZP,m}$) to which as many zero symbols as the number (m) of phases are added may be added to each other. The transmitter 200 may perform FFT processing of the data symbol sequence ($b_{zp}$) to which the added zero symbol is added, and may perform precoding. In this case, the transmitter may perform precoding in which a single spectral shaping filter is applied to the data symbol sequence ($b_{zp}$) obtained by addition of the added zero symbol such that the transmitter 200 is configured to use the common spectral shaping filter.

Thereafter, the transmitter 200 may perform signal modulation on the basis of the precoded data symbol sequence ($Sb_{FFT}$), such that it may form the last transmission symbol sequence (x).

Figure 4:
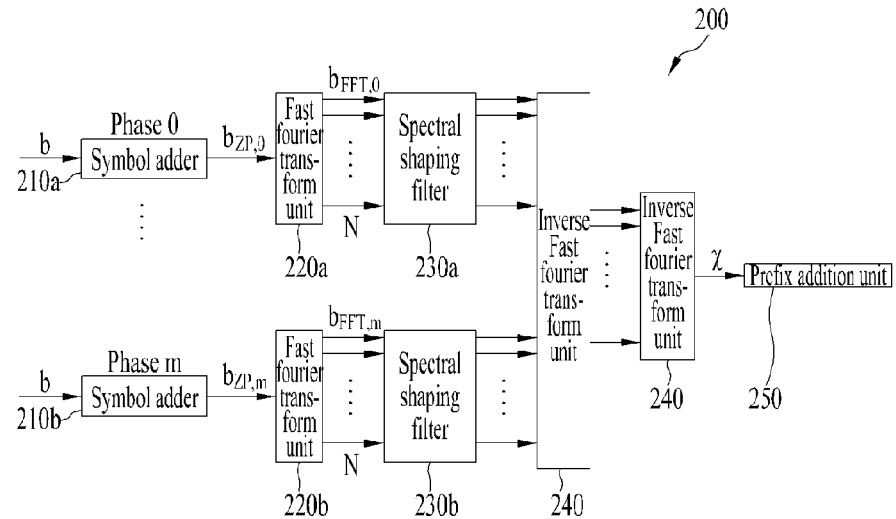
FIG. 4 is a block diagram illustrating a transmitter provided when a multi-symbol subsequence is used and an independent spectral shaping filter is used.

FIG. 4 is a block diagram illustrating a transmitter provided when a multi-symbol subsequence is used and an independent spectral shaping filter is used.

As to the transmitter 200 shown in FIG. 3, the precoding unit 230 may apply different spectral shaping filters to a data symbol sequence ($b_{zp}$) to which as many zero symbols as the number (m) of phases are added.

In more detail, as shown in FIG. 4, the transmitter 200 may apply different spectral shaping filters (230a, 230b) to the data symbol sequence ($b_{zp}$) to which as many zero symbols as the number (m) of phases are added, such that each spectral shaping filter is applied to the transmitter 200.

In this case, the transmitter 200 may add the data symbol sequences ($b_{zp}$) to which the zero symbol is added after application of different spectral shaping filters (230a, 230b), such that it may form the last transmission symbol sequence through signal modulation.

Receiver

Figure 5:
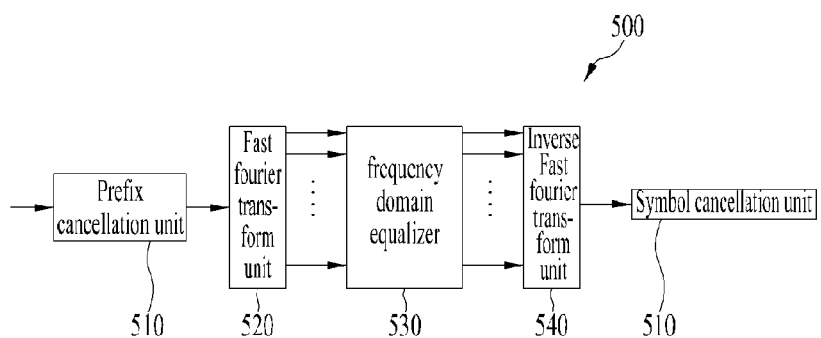
FIG. 5 is a block diagram illustrating a receiver provided when a single symbol subsequence is used.

FIG. 5 is a block diagram illustrating a receiver provided when a single symbol subsequence is used.

Referring to FIG. 5, the receiver 500 may include a prefix cancellation unit 510, an FFT unit 520, a frequency domain equalizer 530, an IFFT unit 540, and a symbol cancellation unit 550.

The prefix cancellation unit 510 may remove the prefix added by the transmitter 200 from the received signal.

The FFT unit 520 may perform FFT processing of the received signal. The FFT unit 520 may multiply the FFT matrix by the reception signal obtained by cancellation of the prefix, such that signal conversion can be carried out.

The frequency domain equalizer 530 may equalize the FFT reception signal on the frequency domain. The frequency domain equalizer 530 may correspond to the precoding unit 230 of the transmitter 200, and may perform inverse precoding.

The IFFT unit 540 may perform IFFT processing of the equalized reception signal so that it may form the last sequence for recovery. The IFFT unit 540 may multiply the IFFT matrix by the equalized reception signal so that it may form the last sequence for recovery.

The symbol cancellation unit 550 may remove the zero symbol added by the transmitter 200. The symbol cancellation unit 550 may remove the (M−1) zero symbols added to each symbol of the data symbol sequence by the transmitter 200, such that it may obtain a previous symbol sequence obtained when the zero symbol is added.

The constituent elements of the receiver 500 shown in FIG. 5 are not all essential, and the receiver 500 may be implemented by more or less constituent elements than those of FIG. 5.

Figure 6:
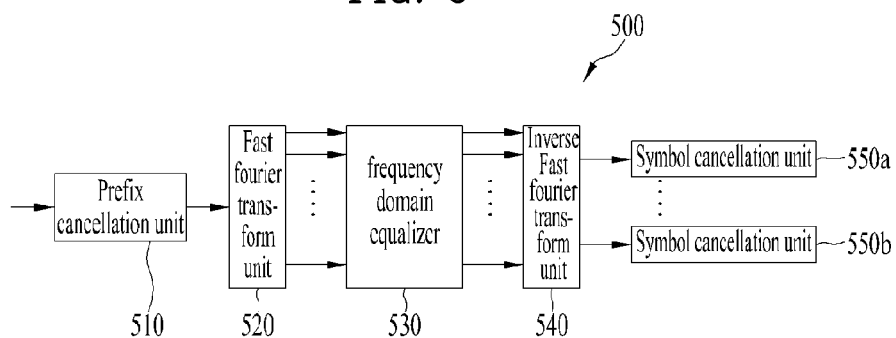
FIG. 6 is a block diagram illustrating a receiver provided when a multi-symbol subsequence is used and a common spectral shaping filter is used.

FIG. 6 is a block diagram illustrating a receiver provided when a multi-symbol subsequence is used and a common spectral shaping filter is used.

Referring to FIG. 3, assuming that the transmitter 200 uses a multi-symbol subsequence and a common spectral shaping filter at the same time, the receiver 500 may include a single frequency-domain equalizer 530 and at least one symbol cancellation unit (550a, 550b) as shown in FIG. 6.

FIG. 7 is a block diagram illustrating a receiver provided when a multi-symbol subsequence is used and an independent spectral shaping filter is used.

Referring to FIG. 4, assuming that the transmitter 200 uses a multi-symbol subsequence and an independent spectral shaping filter, the receiver 500 may require a parallel process configured to use different frequency domain equalizers (530a, 530b) in association with the reception signal of each phase.

Therefore, the receiver 500 may include at least one frequency domain equalizer (530a, 530b) and at least one symbol cancellation unit (550a, 550b).

In the following description, a method for modulating a signal using the transmitter 200 according to an embodiment of the present invention will hereinafter be described with reference to the attached drawings.

Signal Modulation Method

FIG. 8 is a flowchart illustrating a signal modulation method according to an embodiment of the present invention.

Referring to FIG. 8, the transmitter 200 may add the zero symbol (0 symbol) to the data symbol sequence in step S810.

The transmitter 200 may add the (M−1) zero symbols to respective symbols (b(1), b(2) . . . b(N/M)) of the data symbol sequence (b), so that it may form the data symbol sequence ($b_{zp}$) to which the zero symbol having a total length of N is added.

The data symbol sequence (b) serving as a digital signal may include N/M symbols (b(1), b(2) . . . b(N/M)) comprised of binary numbers. That is, the data symbol sequence (b) may be represented by the following equation 1.

$$\text{Data: } b = [b(1) b(2) \ldots b(N/M)]^T \quad \text{[Equation 1]}$$

For example, as shown in FIG. 9A, the data symbol sequence (b) may be a $[1 0 1 1]^T$. sequence having the length of 4(N/M=4).

The transmitter 200 may add the (M−1) zero symbols to respective symbols (b(1), b(2) . . . b(N/M)) of the data symbol sequence (b).

In this case, M may be an arbitrary natural number that selectively adjusts a symbol rate simultaneously while modifying spectral coherence and the shape of spectral correlation.

In this case, it can be assumed that each symbol (b(1), b(2) . . . b(N/M)) to which the (M−1) zero symbols are added is a single subsequence. That is, the subsequence may be a sequence having the length of M when the (M−1) zero symbols are added to each symbol (b(1), b(2) . . . b(N/M)) of the data symbol sequence (b). In addition, the subsequence may be formed one by one at every symbol (b(1), b(2) . . . b(N/M)) of the data symbol sequence (b), such that N/M symbols (b(1), b(2) . . . b(N/M)) may be formed.

The transmitter 200 may add the (M−1) zero symbols to each symbol (b(1), b(2) . . . b(N/M)) of the data symbol sequence (b) as described above, such that it may form the data symbol sequence ($b_{zp}$) to which the zero symbol having a total length of N is added.

That is, the transmitter 200 may form each symbol (b(1), b(2) . . . b(N/M)) of the data symbol sequence (b), and may form the data symbol sequence ($b_{zp}$) to which the zero symbol having a total length N corresponding to the sum of (M−1) zero symbols added to each symbol (b(1), b(2) . . . b(N/M)) of the data symbol sequence (b) is added. Alternatively, the transmitter 200 may form the data symbol sequence ($b_{zp}$) to which the zero symbol comprised of the (N/M) subsequences having the length of M is added.

The data symbol sequence ($b_{zp}$) to which the zero symbol is added may be represented by the following equation 2.

$$b_{ZP} = [b(1) 0_{M-1} b(2) 0_{M-1} \ldots b(N/M) 0_{M-1}]^T \quad \text{[Equation 2]}$$

In Equation 2, $0_{M-1}$ is a sequence comprised of (M−1) successive zero symbols. Likewise, $0_x$ for the arbitrary number (x) may indicate a sequence composed of x successive zero symbols.

The transmitter 200 may divisionally add the (M−1) zero symbols to the front part and the rear part of each symbol (b(1), b(2) . . . b(N/M)) on the basis of a phase.

In addition, the transmitter 200 may add a predetermined number of zero symbols corresponding to the phase value from among the (M−1) zero symbols to the front part and the rear part of each symbol (b(1), b(2) . . . b(N/M)), and may add the number of the remaining zero symbols to the rear part of each symbol (b(1), b(2) . . . b(N/M)). That is, if the phase is denoted by 'm', the transmitter 200 may add the m zero symbols from among the (M−1) zero symbols to the front part of each symbol (b(1), b(2) . . . b(N/M)), and may add the remaining (M−1−m) zero symbols to the rear part of each symbol (b(1), b(2) . . . b(N/M)).

In addition, the transmitter may divisionally add the (M−1) zero symbols to the front part and the rear part of each symbol on the basis of a plurality of phases in different ways, such that as many data symbol sequences ($b_{zp}$) (to which the zero symbol is added) as the number (m) of phases may be formed. In other words, the transmitter 200 may divisionally add the (M−1) zero symbols to the front part and the rear part of each symbol (b(1), b(2) . . . b(N/M)) on the basis of m phases in different ways, such that it may be possible to form m data symbol sequences ($b_{zp}$) to which the zero symbol is added.

In this case, the number of cases through which the (M−1) zero symbols may be divisionally added to the front part and the rear part of each symbol in different ways may range from Phase 0 to Phase (M−1), such that a total number of cases may be set to M. Therefore, the number (b) of phases must be less than M.

After the (M−1) zero symbols are divisionally added on the basis of a plurality of phases in different ways, the data symbol sequence ($b_{zp}$) to which m zero symbols are added may be represented by the following equation 3.

$$\text{Phase 0: } b_{ZP,0} = [b(1) 0_{M-1} b(2) 0_{M-1} \ldots b(N/M) 0_{M-1}]^T$$

$$\text{Phase 1: } b_{ZP,1} = [0 b(1) 0_{M-2} 0 b(2) 0_{M-2} \ldots 0 b(N/M) 0_{M-2}]^T$$

$$\text{Phase 2: } b_{ZP,2} = [0 0 b(1) 0_{M-3} 0 0 b(2) 0_{M-3} \ldots 0 0 b(N/M) 0_{M-3}]^T$$

. . .

$$\text{Phase } m: b_{ZP,m} = [0_m b(1) 0_{M-m-1} 0_m b(2) 0_{M-m-1} \ldots 0_m b(N/M) 0_{M-m-1}]^T \quad \text{[Equation 3]}$$

For example, the transmitter 200 may add two (M=3) zero symbols to each symbol (1, 0, 1, 1) of the data symbol sequence (b) shown in FIG. 9A, such that it may form the data symbol sequence ($b_{zp}$) to which the zero symbol having a total length of 12 is added.

The transmitter 200 may divisionally add two zero symbols to the front part and the rear part of each symbol (1, 0, 1, 1) on the basis of a phase.

In addition, the transmitter 200 may divisionally add the two zero symbols to the front part and the rear part of each symbol (1, 0, 1, 1) on the basis of m phases in different ways, such that it may be possible to form m data symbol sequences to which the zero symbol is added.

Referring to FIG. 9B, as to the data symbol sequence (b) shown in FIG. 9A, the case in which two zero symbols are added to each symbol (1, 0, 1, 1) is shown according to individual phases.

If the phase is set to zero (0), the transmitter may add all the two zero symbols to the rear part of each symbol (1, 0, 1, 1). In contrast, if the phase is set to 1, the transmitter 200 may add a single zero symbol from among the two zero symbols to the front part of each symbol (1, 0, 1, 1), and may add the remaining zero symbols to the rear part of each symbol (1, 0, 1, 1). In addition, if the phase is set to 2, the transmitter may add all the two zero symbols to the rear part of each symbol (1, 0, 1, 1).

As described above, the transmitter 200 may form the data symbol sequence ($b_{zp}$) obtained by the sum of three different zero symbols ranging from Phase 0 to Phase 2.

As described above, the data symbol sequence is converted on the basis of a plurality of phases in different ways, and orthogonality between data units may occur in the time domain when data is transmitted using the same frequency.

Therefore, unlike the OFDMA and SC-FDMA in which subcarriers are exclusively allocated to respective users, the signal modulation method according to the embodiment can analyze data on the basis of orthogonality generated in the time domain although overlapping occurs in the frequency domain, such that all users may share the subcarriers.

Thereafter, the transmitter 200 may multiply the FFT matrix by the data symbol sequence ($b_{zp}$) to which the zero symbol is added in step S820.

According to the FFT processing, when a digital signal is FFT-processed into an analog function for data transmission, the number of calculation times is reduced, such that multiplication of the FFT matrix is performed to implement a high-speed operation with the reduced number of calculation times.

The transmitter 200 may multiply the N-point FFT matrix ($F_N$) having the size of N by the data symbol sequence ($b_{zp}$) to which the zero symbol is added, such that it may perform FFT processing.

The N-point FFT matrix ($F_N$) having the size of N may be represented by the following equation 4.

$$F_N = \frac{1}{\sqrt{N}} \begin{bmatrix} 1 & 1 & \cdots & 1 \\ 1 & \omega_N^{1 \cdot 1} & \cdots & \omega_N^{1 \cdot (N-1)} \\ \cdot & \cdot & \cdot & \cdot \\ \cdot & \cdot & \cdot & \cdot \\ \cdot & \cdot & \cdot & \cdot \\ 1 & \omega_N^{(N-1) \cdot 1} & \cdots & \omega_N^{(N-1) \cdot (N-1)} \end{bmatrix}$$ [Equation 4]

In Equation 4, $\omega_N$ is denoted by $$\omega_N = e^{-j\frac{2\pi}{N}}.$$

The transmitter 200 may multiply the N-point FFT matrix ($F_N$) having the same size (N) as a total length (N) of the data symbol sequence ($b_{zp}$) obtained by addition of the zero symbol by the data symbol sequence ($b_{zp}$) obtained by addition of the zero symbol.

In this case, the transmitter may multiply the N-point FFT matrix ($F_N$) by each data symbol sequence ($b_{zp}$) to which the (M−1) zero symbols are added on the basis of a plurality of phases in different ways.

Referring to FIG. 9C, the 12-point FFT matrix ($F_{12}$) having the size of 12 is for the data symbol sequence ($b_{zp}$) (See FIG. 9B) to which the zero symbol having a total length of 12 is added, and is shown.

The transmitter 200 may multiply a 12-point FFT matrix ($F_N$) having the size of N by the data symbol sequence ($b_{zp}$) to which the zero symbol having a total length of N is added.

In addition, the (M−1) zero symbols are divisionally added on the basis of a plurality of phases in different ways, and the N-point FFT matrix ($F_N$) may be multiplied by each data symbol sequence ($b_{zp}$) to which as many zero symbols as the number of phases are added.

If the phase is denoted by 'm', the result obtained when the N-point FFT matrix ($F_N$) having the size of N is multiplied by the data symbol sequence ($b_{FFT,m}$) to which the zero symbol is added on the basis of the phase (m) is represented by the following equation 5.

$$b_{FFT,m} = F_N b_{ZP,m}$$ [Equation 5]

In association with individual phases from Phase 0 to Phase m, the above-mentioned result can be represented by the following equation 6.

Phase 0: $b_{FFT,0} = [b'^T b'^T \ldots b'^T]^T$

Phase 1: $b_{FFT,1} = [b'^T b'^T \ldots b'^T]^T \odot e_{1/N}$

Phase 2: $b_{FFT,2} = [b'^T b'^T \ldots b'^T]^T \odot e_{2/N}$ $\ldots$

Phase m: $b_{FFT,m} = [b'^T b'^T \ldots b'^T]^T \odot e_{m/N}$ [Equation 6]

In Equation 6, $\odot$ denotes Hadamard transform, and b' is a sequence achieved when the FFT matrix ($F_{N/M}$) having the size of N/M is multiplied by the data symbol sequence (b) obtained before addition of the zero symbol. That is, b' may be represented by the following equation 7.

$$b' = F_{N/M} b$$ [Equation 7]

In Equation 6, $e_{m/N}$ is a column vector having the length of N, and is defined as shown in the following equation 8.

$$e_{m/N} = \left[ e^{-j2\pi\frac{m}{N} \cdot 0} \; e^{-j2\pi\frac{m}{N} \cdot 1} \; e^{-j2\pi\frac{m}{N} \cdot 2} \; \ldots \; e^{-j2\pi\frac{m}{N} \cdot (N-1)} \right]^T$$ [Equation 8]

As can be seen from Equation 6, the data symbol sequence 9b) to which the zero symbol is added to each subsequence divided by changing a phase on a time domain is characterized in that the FFT matrix of the data symbol sequence (b) acquired before the zero symbol is added on the frequency domain after completion of FFT processing is repeated M times.

In addition, in the case of addition of the zero symbol except for the case in which the phase is set to zero (0), the above-mentioned repetition is generated in the form of Hadamard transform having cycling defined by Equation 8 on the basis of a phase.

In conclusion, the data symbol sequences orthogonal to each other in a time domain by addition of the zero symbol on the basis of a phase as shown in Equation 3 may overlap with each other in a frequency domain after completion of FFT processing as shown in Equation 5.

In this case, the resultant data symbol sequence is characterized in that spectral repetition obtained when different cyclic sequences are multiplied according to individual phases after the zero symbol is added to each symbol subsequence is represented by Equation 6.

Thereafter the transmitter 200 may precode the data symbol sequence in step S830.

The transmitter 200 may multiply the precoding matrix (S) by the FFT-processed data symbol sequence ($b_{FFT}$), such that it may perform precoding.

The transmitter 200 may perform spectral shaping of the data symbol sequence ($b_{FFT}$) FFT-processed by the spectral shaping filter. The transmitter 200 may perform precoding in such a manner that a spectrum of a target transmission signal of the FFT-processed data symbol sequence ($b_{FFT}$) is obtained by the spectral shaping filter.

The matrix used by the spectral shaping filter may be a square matrix having the size of N in the same manner as in the FFT matrix. As to the matrix used by the spectral shaping filter, if only spectral shaping is used as a target, diagonal matrices may use a diagonal matrix corresponding to intensity of each subcarrier signal. If shaping combination of signals between subcarriers is used as a target in addition to spectral shaping, a general square matrix may be used instead of a diagonal matrix.

That is, the spectral shaping filter may perform various-purposed precoding including spectral shaping according to selection of a square matrix. Therefore, the transmitter 200 may be simply converted into a general SC-FDMA structure such as interleaved FDMA (IFDMA) or localized FDMA (LFDMA) according to proper selection of the precoding matrix (S).

In conclusion, the transmitter 200 may generalize the legacy multiple access schemes, and may be easily converted according to other schemes, such that it may have high system flexibility compatible with the other systems.

The spectral shaping filter may be differently applied to the FFT-processed data symbol sequence ($F_N b_{FFT}$) according to individual phases. That is, unlike the common spectral shaping filter as shown in FIG. 3, an independent spectral shaping filter is applied to each subsequence of the FFT-processed data symbol according to a phase, such that the data symbol sequence may be spectrally shaped in different ways.

Finally, the transmitter 200 may multiply an inverse IFFT matrix by the data symbol sequence in step S840.

The transmitter 200 may form the last transmission symbol sequence (x) by multiplying an IFFT matrix by the data symbol sequence ($SF_N b_{FFT}$) obtained by multiplication of the precoding matrix. The IFFT matrix is multiplied to convert the data symbol sequence ($SF_N b_{FFT}$) multiplied by the precoding matrix into a time-domain symbol sequence using the N-sized matrix.

The final transmission symbol sequence (x) multiplied by the IFFT matrix is represented by the following equation 9.

$$x = F_N^H SF_N b_{ZP,m} \quad \text{[Equation 9]}$$

In Equation 9, S is a precoding matrix, and $F_N^H$ is an IFFT matrix.

In the case in which the common spectral shaping filter is applied according to a phase as shown in FIG. 3, a discrete time notation of the last transmission symbol sequence (x) may be represented by the following equation 10. In the case in which the independent spectral shaping filter is applied according to a phase as shown in FIG. 4, a discrete time notation of the last transmission symbol sequence (x) may be represented by the following equation 11.

$$x = F_N^H SF_N \sum_m b_{ZP,m} \quad \text{[Equation 10]}$$

$$x = F_N^H \sum_m (S_m F_N b_{ZP,m}) \quad \text{[Equation 11]}$$

In Equations 10 and 11, $S_m$ is a precoding matrix obtained when the zero symbol is added to the data symbol sequence ($b_{zp}$) on the basis of a phase.

In Equations 10 and 11, the data symbol sequence ($b_{zp}$) obtained when the zero symbol is added on the basis of the phase (m) may be generated from different data symbol sequences (b) of each 'm' value.

In addition, the transmitter may add a cyclic prefix to the last transmission symbol sequence in step S850.

The transmitter 200 may add a cyclic prefix to the last transmission symbol sequence (x) so as to prevent the occurrence of inter-channel interference.

In accordance with the OFDM transmission scheme, a guard interval (GI) may be inserted to remove inter-symbol interference based on multiple paths. If there is no signal in the GI, orthogonality of subcarriers is destroyed so that inter-channel interference occurs. In order to prevent the occurrence of inter-channel interference, the cyclic prefix is generated by copying some signals of the rear part of the symbol duration, such that the cyclic prefix may be inserted into and added to the GI.

The transmitter 200 may copy some parts of the rear part of the last transmission symbol sequence (x), such that the cyclic prefix may be added to the last transmission symbol sequence (x).

Throughput or performance of the signal modulation method according to the embodiment of the present invention may hereinafter be compared with that of the legacy scheme.

FIG. 10 illustrates the throughput comparison result between a symbol modulated by a signal modulation method and a BPSK symbol modulated by the SC-FDMA according to an embodiment of the present invention.

Generally, the systems using multiple subcarriers have high PAPR (peak-to-average power ratio) throughput. A transmission signal of the SC-FDMA has a relatively higher PAPR than OFDMA, such that power efficiency of a linear amplifier is very high. Therefore, the fact in which the signal modulation scheme has a higher PAPR throughput as compared to the SC-FDMA is of importance to decision of system throughput.

When a transmission signal is generated for PAPR throughput comparison, the ratio of a time-domain average value of time-domain signal power to momentary power is defined by the following equation 12, such that the ratio may be compared with Cumulative Distribution Function (CDF).

$$PAPR(t) = \frac{|s(t)|^2}{A\{E[|s(t)|^2]\}} \quad \text{[Equation 12]}$$

FIG. 10 illustrates the throughput comparison result between a symbol modulated by a signal modulation method and a BPSK symbol modulated by the SC-FDMA according to an embodiment of the present invention.

The signal modulation method according to the embodiment assumes the case of using the common spectral shaping filter, and uses a Square Root Raised Cosine (SRRC) matrix using the spectral shaping matrix. The transmission signal may divide the data symbol sequence into two subsequences, and may add the zero symbol on the basis of Phase 0 and Phase 1 at M=4.

Referring to FIG. 10, it can be confirmed that PAPR performances of two modulation signals are commonly improved by the rolloff ON-state of the SRRC. However, according to the signal modulation method of the embodiment, the reason why the PAPR performance is relatively low is that the multi-symbol subsequence to which the zero symbol is added on the basis of Phase 0 and Phase 1 is used. That is, in the case of using a BPSK symbol, there is a high possibility that the same symbols are arranged contiguous to each other in two contiguous symbol intervals from the viewpoint of a time domain, such that the same amplitude/phase pulses are successively synthesized and a maximum value is amplified, resulting in reduction of PAPR performance.

FIG. 11 is a graph illustrating the throughput comparison result between a symbol modulated by a signal modulation method and a Gaussian codebook symbol modulated by the SC-FDMA according to an embodiment of the present invention.

In accordance with the signal modulation method of the embodiment, a modulation signal is formed under the same condition as in the performance comparison.

Referring to FIG. 11, it can be confirmed that the Gaussian codebook has the same PAPR distribution irrespective of roll-off variation. Unlike the case in which symbol cardinality is low in the same manner as in BPSK, the Gaussian codebook has a very low probability that the same symbol is repeated in contiguous symbol times, and the associated effect and spectral shaping influence may be very low, so that the same PAPR distribution appears irrespective of roll-off variation. A maximum value is decided by a high-amplitude symbol from among individual symbols, such that the Gaussian distribution for the Gaussian symbols may greatly affect the PAPR distribution.

Referring to FIG. 11, a lower PAPR performance difference appears as compared to the BPSK, and throughput or performance of the signal modulation method according to the embodiment may gradually increase as the BPSK proceeds to a higher-dimension modulation scheme.

The signal modulation method according to the embodiment may be established by a design of different schemes appropriate for each user group of different user groups according to the channel environment.

First Embodiment

If channel information utilization is most extremely limited, i.e., if there are high-mobility users, there is high system complexity for channel estimation and tracking, such that there is a difficulty in feeding back channel information in real time.

Therefore, it is impossible to perform precoding according to a channel situation, the signal modulation method according to the embodiment may independently allocate subcarriers corresponding to a narrow band to respective users in the same manner as in OFDMA, such that orthogonality can be easily guaranteed.

In this case, the occurrence of spectrum correlation may be discarded at M=1.

Second Embodiment

If it is possible to completely feed back channel information to the transmitter and it is impossible to use channel information from the interference user, the signal modulation method according to the embodiment may be used similarly to the CDMA.

That is, the effect obtained by addition of the zero symbol can be utilized. Instead of using the method in which a sufficiently high M value as compared to an available frequency band is selected and a symbol transfer rate is reduced, a signal of each user appears in the frequency band in such a manner that spectrum correlation appears several times.

In this case, the spectrum repetition and cyclic pattern may be changed according to phase selection and the number of added zero symbols of symbol subsequences. As a result, interference cancellation may be possible through the effect similar to the spreading gain for use in CDMA.

Third Embodiment

In addition to the same condition as in the second embodiment, if not only the above-mentioned information but also channel information from an interference user can be fed back to the transmitter of all users, transmitter adaptation is performed through spectral shaping of each transmitter, such that the most aggressive interference avoidance is possible.

For example, if the scope of the embodiment is limited to uplink, a base station (BS) may perform precoding through transmitter adaptation in such a manner that reception signals from all users have the same spectrum.

In this case, it is considered that the BS has the same channels from individual users, such that the BS may simply perform equalizing only using the frequency domain equalizer (FDE) for a single user.

Accordingly, the BS need not detect additional multiple users in so far as the 0-symbol additional phases do not intentionally overlap each other.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A signal modulation method for data communication comprising:
    adding (M−1) zero symbols to each symbol of a data symbol sequence, and forming a data symbol sequence to which a zero symbol having a total length of N is added, wherein each of M and N is an integer having a value greater than 1;
    performing an N-point Fast Fourier Transform (FFT) process on the formed data symbol sequence;
    precoding the FFT-processed data symbol sequence; and
    forming a final transmission symbol sequence by performing an Inverse FFT (IFFT) on the precoded data symbol sequence,
    wherein the precoding of the FFT-processed data symbol sequence includes performing spectral shaping of the FFT-processed data symbol sequence by applying at least one spectral shaping filter.

2. The method according to claim 1, wherein the forming of the data symbol sequence further includes:
    divisionally adding the (M−1) zero symbols to a front part and a rear part of each symbol of the data symbol sequence on the basis of a phase.

3. The method according to claim 2, wherein the forming of the data symbol sequence further includes:
    adding a predetermined number of zero symbols corresponding to the phase value from among the (M−1) zero symbols to the front part of each symbol of the data symbol sequence, and adding the remaining number of zero symbols other than the predetermined number of zero symbols to the rear part of each symbol of the data symbol sequence.

4. The method according to claim 2, wherein the forming of the data symbol sequence further includes:

divisionally adding the (M−1) zero symbols to the front part and the rear part of each symbol of the data symbol sequence on the basis of a plurality of phases in different ways, such that as many data symbol sequences to which the zero symbol is added as the number of the plurality of phases are formed.

5. The method according to claim 1, wherein the forming of the data symbol sequence includes divisionally adding the (M−1) zero symbols to a front part and a rear part of each symbol of the data symbol sequence on the basis of a plurality of phases in different ways, and forming as many data symbol sequences as the number of the plurality of phases, and wherein the precoding of the FTT-processed data symbol sequence includes applying different spectral shaping filters to as many data symbol sequences as the number of phases.

6. The method according to claim 1, further comprising:
adding a cyclic prefix to the final transmission symbol sequence.

7. A transmitter comprising:

a symbol addition unit configured to add (M−1) zero symbols to each symbol of a data symbol sequence, and form a data symbol sequence to which a zero symbol having a total length of N is added, wherein each of M and N is an integer having a value greater than 1;

a Fast Fourier Transform (FFT) unit configured to perform an N-point FFT process on the formed data symbol sequence;

a precoding unit configured to precode the FFT-processed data symbol sequence; and an Inverse FFT (IFFT) unit configured to form a final transmission symbol sequence by performing an IFFT on the precoded data symbol sequence.

8. The transmitter according to claim 7, wherein the symbol addition unit divisionally adds the (M−1) zero symbols to a front part and a rear part of each symbol of the data symbol sequence on the basis of a phase.

9. The transmitter according to claim 8, wherein the symbol addition unit adds a predetermined number of zero symbols corresponding to the phase value from among the (M−1) zero symbols to the front part of each symbol of the data symbol sequence, and adds the remaining number of zero symbols other than the predetermined number of zero symbols to the rear part of each symbol of the data symbol sequence.

10. The transmitter according to claim 8, wherein the symbol addition unit divisionally adds the (M−1) zero symbols to the front part and the rear part of each symbol of the data symbol sequence on the basis of a plurality of phases in different ways, such that as many data symbol sequences to which the zero symbol is added as the number of the plurality of phases are formed.

11. The transmitter according to claim 7, wherein the precoding unit is further configured to perform spectral shaping of the FFT-processed data symbol sequence by applying at least one spectral shaping filter.

12. The transmitter according to claim 7, wherein the symbol addition unit divisionally adds the (M−1) zero symbols to a front part and a rear part of each symbol of the data symbol sequence on the basis of a plurality of phases in different ways, and forms as many data symbol sequences as the number of the plurality of phases, and wherein the precoding unit applies different spectral shaping filters to as many data symbol sequences as the number of phases.

13. The transmitter according to claim 7, further comprising:

a prefix addition unit for adding a cyclic prefix to the final transmission symbol sequence.

* * * * *